(12) United States Patent
Tiraspolsky (10) Patent No.: US 8,755,799 B1
(45) Date of Patent: Jun. 17, 2014

(54) PROVISIONING AND USING WILDCARDED PRIVATE IDENTITY TO REGISTER DEVICES FOR WIRELESS SERVICES

(71) Applicant: Cellco Partnership, Basking Ridge, NJ (US)

(72) Inventor: Alexander Tiraspolsky, Newton, MA (US)

(73) Assignee: Cellco Partnerhsip, Basking Ridge, NJ (US)

( * ) Notice: Subject to any disclaimer, the term of this patent is extended or adjusted under 35 U.S.C. 154(b) by 0 days.

(21) Appl. No.: 13/727,123

(22) Filed: Dec. 26, 2012

(51) Int. Cl.
*H04W 4/00* (2009.01)

(52) U.S. Cl.
USPC ..... 455/435.1; 455/410; 455/411; 455/414.1; 455/463

(58) Field of Classification Search
None
See application file for complete search history.

(56) References Cited

U.S. PATENT DOCUMENTS

2004/0196796 A1* 10/2004 Bajko et al. .................. 370/310

OTHER PUBLICATIONS

3GPP TS 23.002 V12.0.0 (Sep. 2012); 3rd Generation Partnership Project; Technical Specification Gruop Services and System Aspects; Network architecture (Release 12); Advanced LTE, 2012.

* cited by examiner

*Primary Examiner* — Suhail Khan (57) ABSTRACT

Systems and techniques are provided for registering similar subscriber devices in a communication network. A unique Private Identity (PRID) is generated for several user devices associated together under one user account for service through the communication network. The PRID includes a group indicator identifying the PRID's association with a group of devices subject to a common service profile, a Public Identity (PUID) string of characters that uniquely identifies the one user account, and a device identifier uniquely assigned to identify the respective device within the group under the one user account. One common PRID is generated for identifying the common service profile with respect to all of the devices of the group under the one user account. The common PRID includes the group indicator, the PUID, and a wildcard in a field of the predetermined format for a device identifier.

20 Claims, 7 Drawing Sheets

FIG. 1

```
        <privateUserId>

<privateUserId>311480466555500@vzims.com</privateUserId>

<provisionedImsi>
<provisionedImsi>311480466555500</provisionedImsi>
        </provisionedImsi>

<msisdn>17814665555</msisdn>
<preferredAuthenticationScheme>tlsDigestAkaV2</preferredAuthenticationScheme>

</privateUserId>

<privateUserId>

<privateUserId>001178146655550@vzims.com </privateUserId>
<msisdn>17814665555</msisdn>
<preferredAuthenticationScheme>none</preferredAuthenticationScheme>

</privateUserId>
```

PROVISIONING AND USING WILDCARDED PRIVATE IDENTITY TO REGISTER DEVICES FOR WIRELESS SERVICES

BACKGROUND

In recent years, the use of mobile devices has become commonplace among the general consumer population. Furthermore, many consumers now own multiple mobile devices capable of mobile communications. The increase in the number of mobile communication devices running on communications networks presents several challenges. One such challenge relates to the storage and maintenance of subscriber profiles.

Currently, IP Multimedia Subsystem (IMS) communications networks require data about a subscriber and the subscriber's devices to be stored in a subscriber profile database known as a Home Subscriber Server (HSS) database. The HSS is a master database for a given user and contains subscription-related information to support the network entities actually handling calls/sessions.

A subscriber's profile may be defined by the subscriber's primary number, which may be referred to as the subscriber's Public Identity (PUID). Each subscriber may have a unique PUID. The communication devices used by the subscriber can be distinguished by an identifier known as the subscriber's Private Identity (PRID). Each of the subscriber's devices may have a unique PRID. Furthermore, a combination of the PUID and the PRID may be unique for any device attached to the IMS network. Information relating to the various PRIDs, together with the relevant service parameters and permissions may be stored in the subscriber's HSS profile.

Because of an increase in the number of consumers who now use mobile communications devices, and because of an increase in the average number of devices used by subscribers, the demand for HSS storage is growing. Hence, there is still room for further improvement in the provisioning of such identifiers, for example, to reduce the demand for HSS storage.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The various systems and techniques disclosed herein relate to reducing the storage used for HSS profiles of subscribers.

The systems and techniques disclosed herein enable a wireless carrier or operator of a mobile communication network to register multiple related subscriber devices in the network service architecture with similar PRIDs to provide similar services to each of the related subscriber devices. For example, a subscriber may register multiple related wireless devices (e.g., eReader, a tablet device, etc.) in the network service architecture by utilizing specially constructed PRIDs so that similar services may be authorized by the HSS for the similar devices. The specially constructed PRIDs may include information that uniquely identifies each of the devices; however, from the perspective of the HSS, related devices are identified as a group under a single profile, thus saving the HSS from storing a specific profile for each device.

In an example, a PUID+PRID pair is registered to a Serving Call Session Control Function (S-CSCF). The PUID is used to identify a specific subscriber, and the PRID is used to identify the subscriber devices. The S-CSCF generates a specially constructed PRID based on the PUID+PRID pair, which the S-CSCF uses in queries to the HSS. The HSS returns the service profile associated with PUID and the specially constructed PRID to the S-CSCF. While specially constructed PRIDs provide information that may uniquely identify subscriber devices, the HSS may only be concerned with a subset of the information that is necessary for providing the appropriate services since the HSS provides different services for different categories of subscriber devices (e.g., smartphone, tablet, laptop, etc.) as opposed to different subscriber devices (e.g., individual smartphone, tablet, laptop, etc.).

The detailed description below uses a number of terms with respect to various system components and operations. Although generally known, use of several of these terms may not be strictly standardized. For the convenience of the reader, the following definitions for some of the relevant terms are presented, as used by way of example in the detailed description below.

The terms "operator" and "carrier" are used herein interchangeably to refer broadly and inclusively to any provider or supplier of network communication services, including by way of example services for the transmission of real-time voice and data communications for users/subscribers through wireless/mobile or landline communication networks. A network operator or carrier can be, for example and without limitation, a wireless and/or landline service provider that provides various communication services to subscriber devices. The services provided by the carrier may include, for example and without limitation, Voice-over Internet Protocol (VoIP) services for subscribers to use a personal computer or similar computing device to make and receive phone calls over Internet Protocol (IP) networks including the Internet or similar networks.

The term "client" is used herein to refer broadly to any process configured to consume a functionality of an application offered by a server. For example, when a client uses an application running on another computer or other device connected to a network, the client is generally utilizing at least one function of the service offered by the other computer/device which is configured as an application server. Such a client may be executed at any type of computing device including, for example and without limitation, a desktop computer or workstation, a mobile device, or a host or network device that may operate at other times as a server to other clients. Such a server may be any type of computing device capable of communicating data to one or more clients over a communication network. Further, a client can be any type of remote or local process with respect to the computing device executing or hosting the service. Also, a client can be another application or service.

Figure 1:
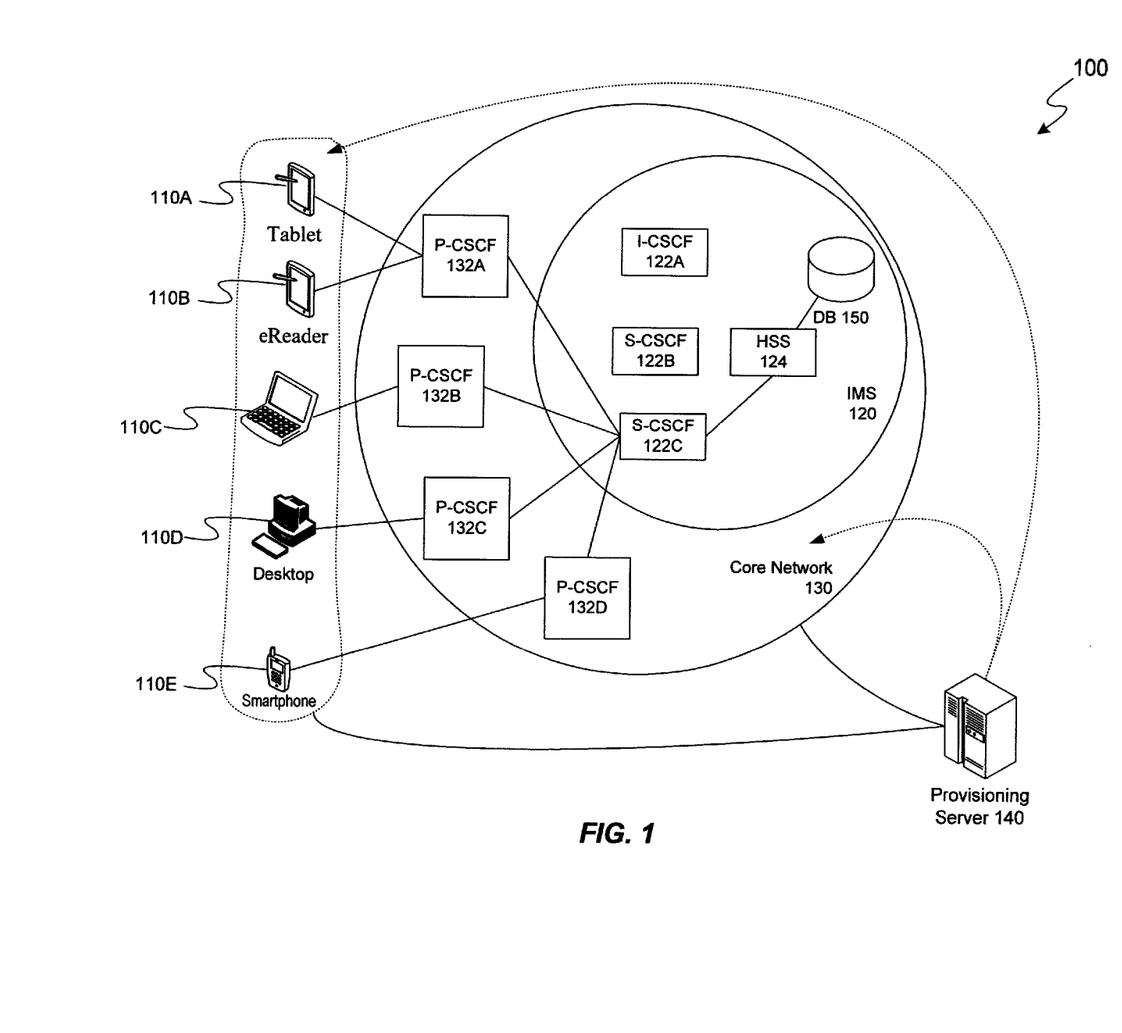
FIG. 1 illustrates an example of a network service architecture for multiple devices of the same subscriber sharing the same PUID and different PRIDs.

Reference now is made in detail to the examples illustrated in the accompanying drawings and discussed below. FIG. 1 illustrates an example of a network service architecture 100 for multiple devices of the same subscriber sharing the same PUID and different PRIDs. Stated differently, FIG. 1 illustrates an example of a network service architecture for multiple devices of different subscribers or profiles connected to the core network.

In some instances, a subscriber's devices may be referred to as user equipment (UE). User equipment can include, for example, mobile computers, tablet computers, mobile devices (e.g., a smartphone or PDA), desktop computers, set top boxes (e.g., for a television), video game consoles, or any other devices having processing capabilities, communications capabilities, and memory.

In this example, the subscriber devices include a tablet computer 110A, an eReader computer 110B, a laptop computer 110C, a desktop computer 110D, and a smartphone device 110E. Each of the subscriber's devices 110 uses a combination of the PUID of the subscriber and the PRID of the subscriber's device 110 to register for service. The PUID and PRID may be configured, provisioned, or assigned to register for services as described more fully below.

The communication services, which are provided by an IMS network 120, can include for example, voice, video, messaging, and data services. In this example, the subscriber devices 110A-100E are communicatively coupled to a core network 130 to receive communication services from or controlled by applications or the like running in the elements of the IMS network 120. The subscriber devices 110A-110E may be communicatively coupled to the core network 130 via wireless/mobile or landline communication access networks not separately shown. For example, tablet 110A, eReader 110B, and smartphone 110E may be communicatively coupled to the core network 130 via a wireless or mobile communication network, while laptop 110C and desktop 110D computing devices may be connected to the core network 130 via a landline communication network such as an optical fiber or coaxial cable type network. At a high level, the core network 130 provides access to services of or controlled by the IMS network 120. Services are provided to users of the subscriber devices 110A-100E via communications through the core network 130. In network service architecture like that shown, the IMS network 120 stores data corresponding to each subscriber and all devices of each subscriber in the HSS subscriber profile database.

The core network 130 is also connected to a provisioning server 140. In some implementations, the provisioning server 140 provides information related to different subscribers to the subscriber devices 110A-110E as well as the HSS 124. The information provided is stored in local memory on the subscriber devices 110A-110E and in a database 150 associated with the HSS 1124. The information is used for authenticating and authorizing services to be controlled by the IMS 120. The information related to subscribers may include PUIDs, PRIDs, and wildcarded PRIDs associated with the subscriber devices 110A-110E. In some implementations, subscriber devices 110A-110E may be separately programmed to include the PUID and PRID data. Once the PUIDs and PRIDs have been provisioned to the subscriber devices 110A-110E and the wildcarded PRIDs have been provisioned to HSS 124, a combination of the PUIDs, PRIDs and wildcarded PRIDs may be exchanged in order to authenticate and authorize services to be provided to the subscriber devices 110A-110E, as described in further details below.

As discussed above, the profile of the subscriber may be defined by a unique PUID number. Additionally, each of the multiple subscriber devices can be distinguished by a PRID. Since the PRID is unique per device per subscriber, a PUID+PRID pair will also be unique for any device attached to the IMS network 120. Furthermore, information relating to all PRIDs that may include relevant service parameters and permissions may also be stored in the HSS profile of the subscriber. In many cases, subscribers may use a set of the similar devices (e.g., multiple tablets, or multiple portable computers) that may have the same service parameters and permissions. Thus, assigning the same PRID string to all the devices with a common service profile (e.g., having the same parameters and permissions) may conserve space on the HSS.

In order to register the subscriber devices 110A-100E for services, each of the subscriber devices 110A-100E establishes a signaling connection with any available Call Session Control Function (CSCF) acting as a Proxy CSCF (P-CSCF) 132. Thus, the P-CSCF is the first contact point within the core network for the subscriber's devices 110A-110E. In FIG. 1, the tablet computer 110A and the eReader computer 110B establish a signaling connection with the first P-CSCF 132A, the laptop computer 110C establishes a signaling connection with the second P-CSCF 132B, the desktop computer 110D establishes a signaling connection with the third P-CSCF 132C, and the smartphone device 110E establishes a signaling connection with the fourth P-CSCF 132D.

Each of the P-CSCFs 132A-132D uses the subscriber's PUID or the subscriber's PUID in combination with the PRID of the subscriber's device(s), to discover a Serving CSCF (S-CSCF) that will render IMS network services to the subscriber's device(s). In this example, P-CSCFs 132A-132D are connected to S-CSCF 122C. In some aspects, the same S-CSCF is used to connect all devices of a single subscriber to the HSS. The S-CSCF queries the HSS 124 using the PUID and the PRID of the subscriber's device to obtain profile parameters and permissions to detect the services that should be rendered to the subscriber's device. In some aspects, an Interrogating CSCF (I-CSCF) 122A may be used to enable requests to be routed to the correct S-CSCF, as there may be several S-CSCFs within the IMS network 120. For example, IMS network 120 includes a first S-CSCF 122B and a second S-CSCF 122C. The I-CSCF 122A may interrogate the HSS to obtain the address of the relevant S-CSCF to process the Session Initiation Protocol (SIP) request.

Typically, in an IMS network, each of the subscriber's devices 110A-110E shares a PUID to be served by the same S-CSCF. In this example, however, the S-CSCF 122C will generate an alternate wildcarded PRID based on the actual PRID value of the subscriber's device, and will use this wildcarded PRID together with the PUID to query the HSS 124. The HSS 124 will return service profile associated with this wildcarded PRID, and will record the serving server address of the PUID and wildcarded PRID combination instead of PUID and PRID combination.

In some examples, the wildcarded PRID may be constructed based on the following format:

[Group prefix][PUID][device id in group]@[operator domain].

The first element, the [Group prefix], is provided as a number string that identifies the PRID as a specially constructed PRID for a unique group of devices under a subscriber profile. This specially constructed PRID may be subsequently wildcarded. The [Group prefix] may be represented as 001, where 00 provides an indication that the PRID is a special construct by the I/S-CSCF, and the 1 following the 00 provides an indication number for the group of devices. While this example of the [Group prefix] is a three digit number, the [Group prefix] may be generated to be a number string of a variety of digits that provide indications of a variety of characteristics.

The [PUID], which follows the [Group prefix], is provided as a number string associated to the subscriber's PUID on account. As indicated above, each subscriber has a unique PUID. Accordingly, the [PUID] may be used to identify a specific subscriber. In some aspects, a subscriber's [PUID] number string may represent a phone number associated with the subscriber. Since phone numbers are unique to a subscriber, the [PUID] number string in the wildcarded PRID may be used to identify the subscriber.

Next, the [device id in group] is a number string that is assigned to each individual device in the group. The [device ID in group] may be a number string that is not all zeros. In other words, the string may be any number of digits (e.g., one digit, two digits, three digits, etc.). Since there is no limit to the number of digits the [device id in group] number string may be, an unlimited number of individual devices may be included in a group and represented by the wildcarded PRID. For example, a first [device id in group] may be represented by a 01, a second [device id in group] may be represented by a 02, . . . , an eleventh [device id in group] may be represented by a 11, and so on. Since no [device id in group] number string may be all zeros, no additional devices in the group will be confused with the first device in this example. Lastly, the [operator domain] provides an indication of the service provider (e.g. mobile operator) network domain name. Thus, the [operator domain] identifies the service provider utilized by the subscriber for which the wildcarded PRID is generated.

The use of wildcarded PRIDs may be illustrated by an example of a subscriber installing video communication clients on multiple devices with a same PUID.

For example, the subscriber may utilize a tablet and an eReader under the same PUID. In order to be used as alternative devices for his video communication service, both devices may be configured with a same PUID, for example 17814665555, which corresponds to the phone number of the subscriber. The tablet may be configured with PRID 001178146655551@vzims.com (group prefix 001, PUID 17814665555, device id in group 1); and the eReader, which is considered to be a device of the tablet group, may be configured with PRID 001178146655552@vzims.com (group prefix 001, PUID 17814665555, device id in group 2). Each of the above two PRID can be generated and assigned dynamically upon registration in IMS network 120.

Figure 2A:
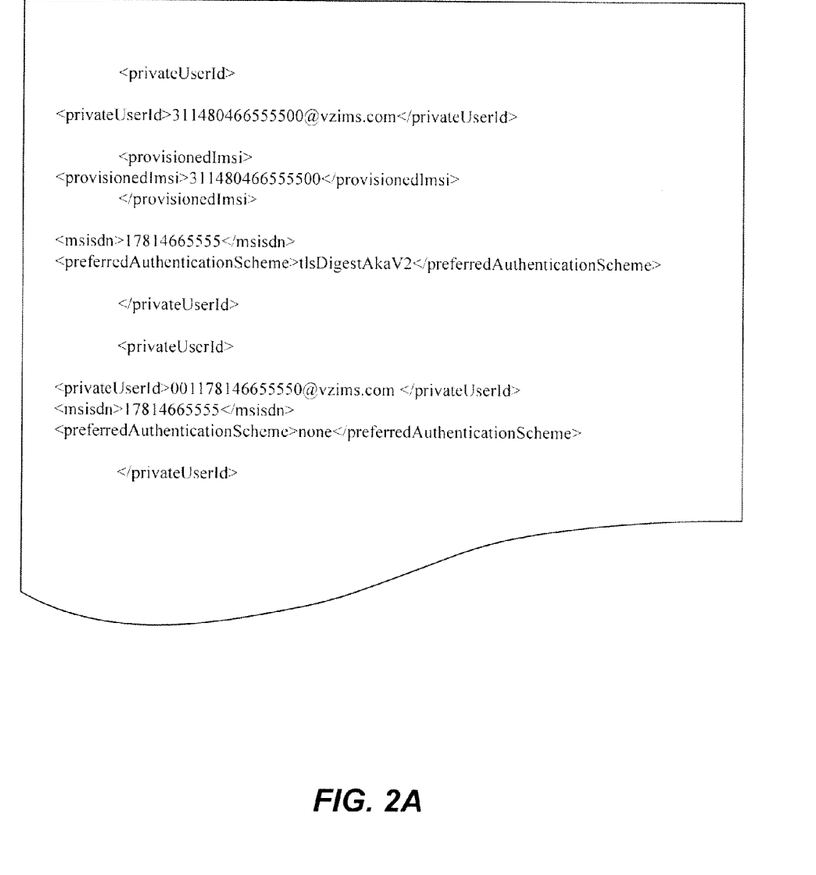
FIG. 2A illustrates an example of a record of a subscriber profile that includes multiple devices in the network service architecture.

FIG. 2A illustrates an example of a record of a subscriber profile that includes multiple devices in the network service architecture 100. The HSS profile for this subscriber device will include the regular PRID for the specific subscriber device (i.e. primary mobile phone) and a wildcarded PRID corresponding to the category (e.g., tablets, laptop, etc.) of the subscriber device. The relevant HSS record fragment may appear as shown in FIG. 2A. In this example, the mobile video communication service subscriber has a phone number 17814665555, as indicated above. Since the PUID is related to the phone number associated with the subscriber, the PUID number string of the subscriber is provided as 17814665555. The PUID number string, once known, makes it possible for the system to identify the preceding and proceeding number string. For example, any group of numbers that precedes the PUID may be identified as the group prefix. The group prefix identifies the category of the subscriber device. For example, the group prefix shown as "001" preceding the PUID may identify a category of subscriber device such as tablets. As a result, all tablet devices of a single subscriber will have a group prefix of "001" in the HSS record.

Similarly, any group of number that follows the PUID may be identified as device id in group. In some aspects, both the group prefix and device id in group must be provided for there to be a properly wildcarded PRID. Alternatively, non-wildcarded PRIDs of mobile phones of the subscriber may be provided as the International Mobile Subscriber Identity (IMSI) of the device, (e.g., 311480466555500). Lastly, the network domain name is provided as vzims.com.

Figure 2B:
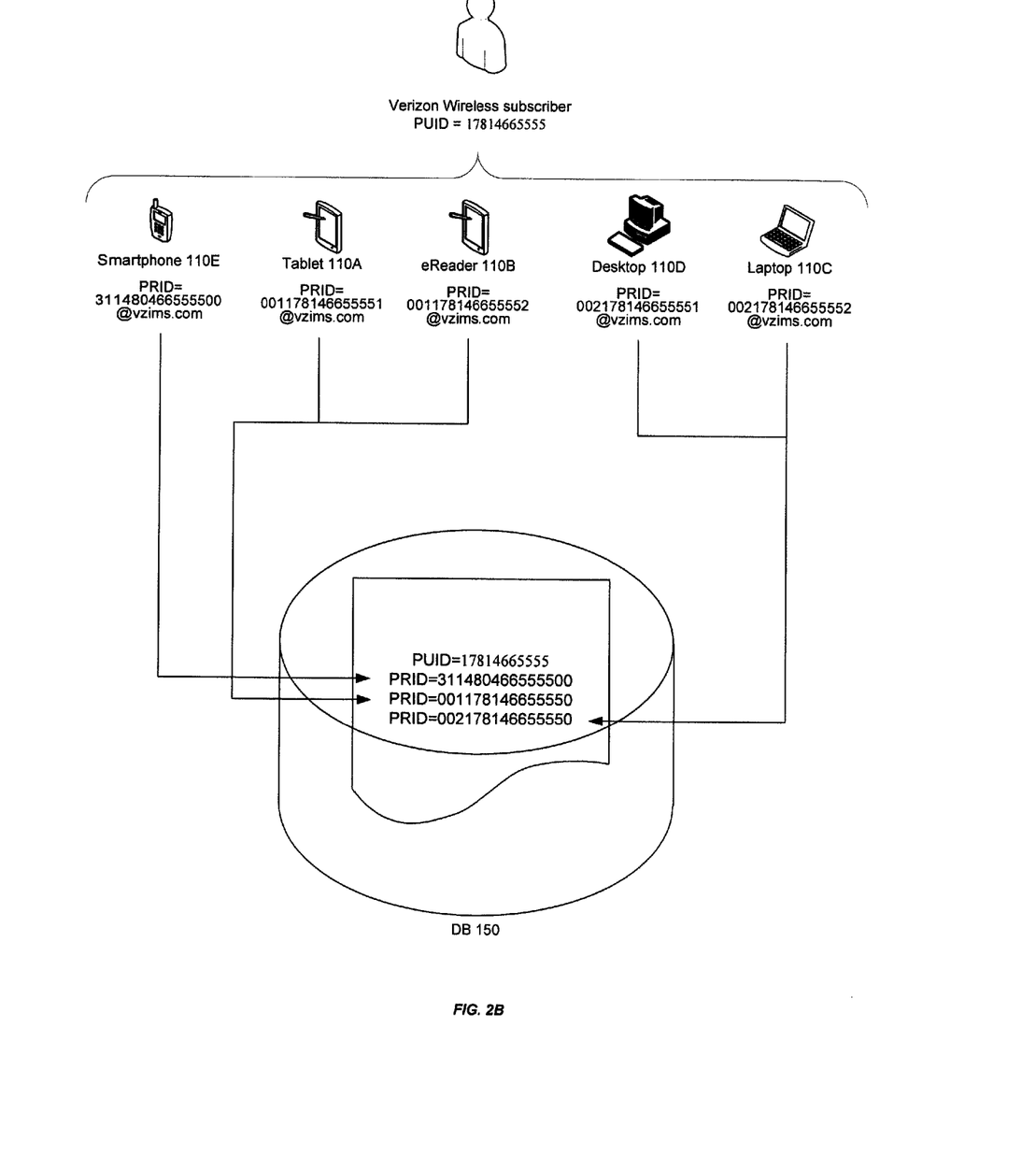
FIG. 2B illustrates example PRIDs from multiple devices of a subscriber profile stored on a Home Subscriber Server database.

FIG. 2B illustrates example PRIDs from multiple devices of a subscriber profile stored on a HSS database 150. Smartphone 110E, Tablet 110A, eReader 110B, Desktop 110D and Laptop 110C are depicted as devices that all belong to a single subscriber. The devices in this example all fall into one of three categories. Generally, devices of the same category request the same types of services. Thus, sharing a single profile among devices of the same category may be practicable and efficient. As shown in FIG. 2B, Tablet 110A and eReader 110B are determined to be devices of the same category. Thus, Tablet 110A and eReader 110B share a wildcarded PRID 001178146655550, where the group prefix "001" identifies the group to which Tablet 110A and eReader 110B belong. Similarly, Desktop 110D and Laptop 110C are the same category of devices as well, and also share a common PRID. The group prefix for the Desktop 110D and Laptop 110C ("002") are different from the group prefix from Tablet 110A and eReader 110B, since the two groups have dissimilar services. The wildcarded PRIDs are subsequently compared to those PRIDs stored on the HSS database 150 to determine what services are available to a specific subscriber device.

Figure 3:
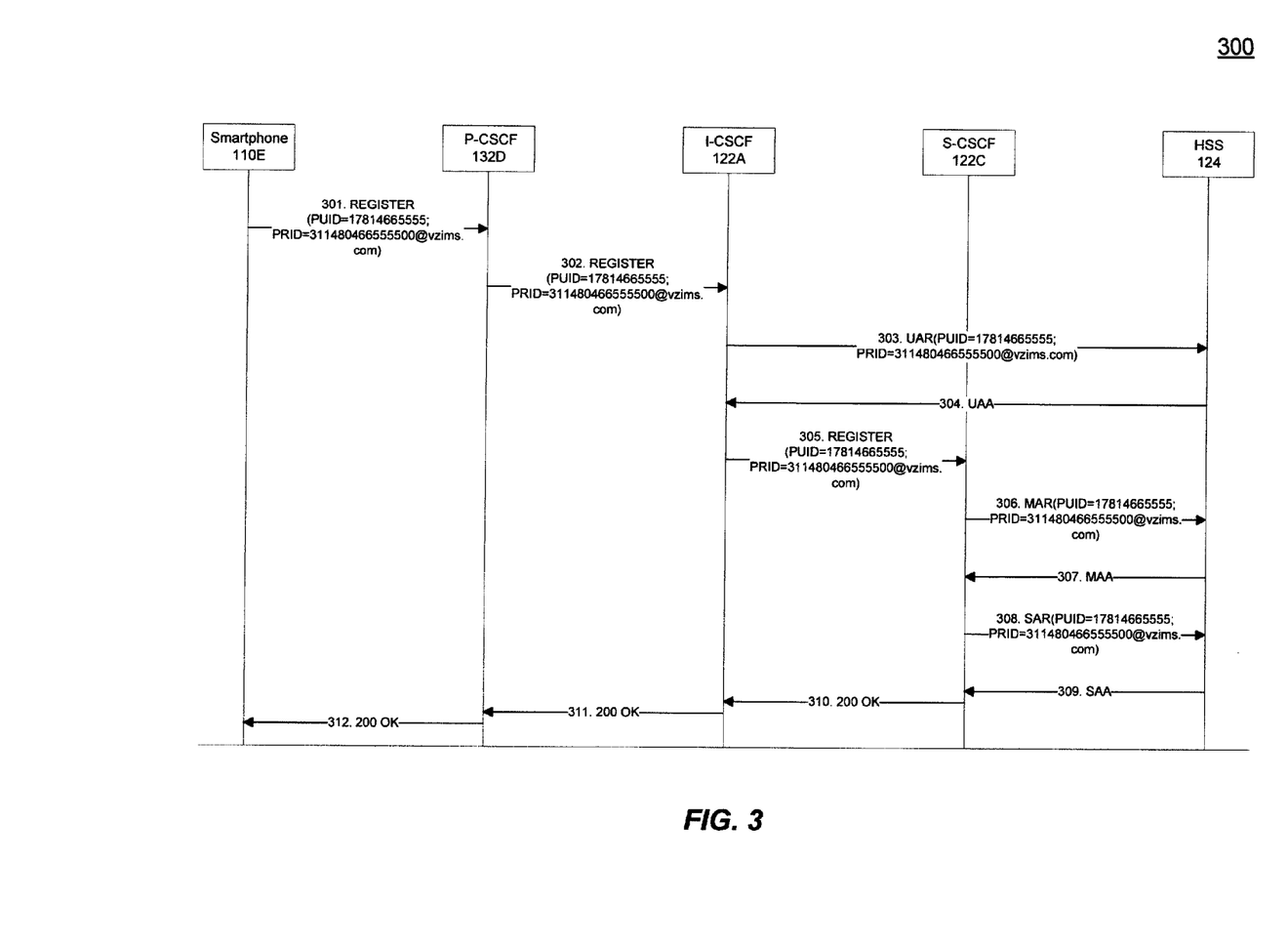
FIG. 3 is a flowchart of an exemplary process for registering a unique subscriber device in network service architecture.

FIG. 3 is a flowchart of an exemplary process 300 for a normal process of registering a subscriber device in network service architecture 100. By way of example, process 300 will be described using the component systems/devices of networking environment 100 of FIG. 1, as described above. Thus, in the example shown in FIG. 3, the steps of process 300 implement the above-described registration process for registering relevant authentication and authorization information related to smartphone device 110E with HSS 124 of networking environment 100 of FIG. 1, as described above. Thus, while process 300 is described registering smartphone device 110E with HSS 124 via P-CSCF 132D, I-CSCF 122A, and S-CSCF 122C, it should be noted that process 300 is not intended to be limited thereto and that process 300 may be used with devices and systems of different networking environments.

As shown in FIG. 3, process 300 begins at step 301, in which smartphone device 110E sends a register message to the P-CSCF 132D. The register message may include the PUID, which is the mobile subscriber integrated services digital network (ISDN) number of the smartphone device 110E, and the PRID, which is an image of the IMSI combined with the operator domain (e.g., @vzims.com in this case). In step 302, P-CSCF 132D delivers the register message to the I-CSCF 122A in order for the I-CSCF 122A to check if the smartphone device 110E has the right to be registered based on the PUID and PRID. If the PRID and PUID pair is determined to be a proper subscriber, the I-CSCF 122A, in step 303, passes a user authentication request (UAR) message which again includes the PUID and PRID on to the HSS 124. The HSS 124 compares the PUID and PRID to records stored on the HSS 124 in order to determine if the exact PUID and PRID are defined in this record. If a determination is made by the HSS 124 that the PUID and PRID pair is found in the record, the HSS 124 returns a user authentication acknowledgement (UAA) message in step 304 to the I-CSCF 122A, indicating that information about the pair exists.

In step 305, the I-CSCF 122A assigns the S-CSCF 122C for the PUID and PRID pair associated with the smartphone device 110A by sending a register message to the particular S-CSCF 122C responsible for the number. The S-CSCF 122C checks the PUID and PRID pair again to determine whether the PRID is a real one.

The multimedia authorization request (MAR) is sent to the HSS 124 by the S-CSCF 122C in step 306 to request a particular service. If the particular service is enabled, the HSS 124 returns a multimedia authorization acknowledgement (MAA) to the S-CSCF 122C in step 307. In step 308, the S-CSCF 122C updates the HSS by sending a server assignment request (SAR), which provides an indication that the S-CSCF 122C will serve the smartphone device 110E. In step 309, the HSS 124 confirms the assignment by returning a server assignment answer (SAA) to the S-CSCF 122C.

In steps 310, the S-CSCF 122C sends code (e.g., "200 OK") to the I-CSCF 122A indicating that the register operation completed successfully. The I-CSCF 122A, in turn, sends the same code to the P-CSCF 132D, also indicating that the register operation completed successfully. Lastly, the P-CSCF 132D relays the register operation completed code to the smartphone device 110E, thus completing the normal registration process.

Figure 4A:
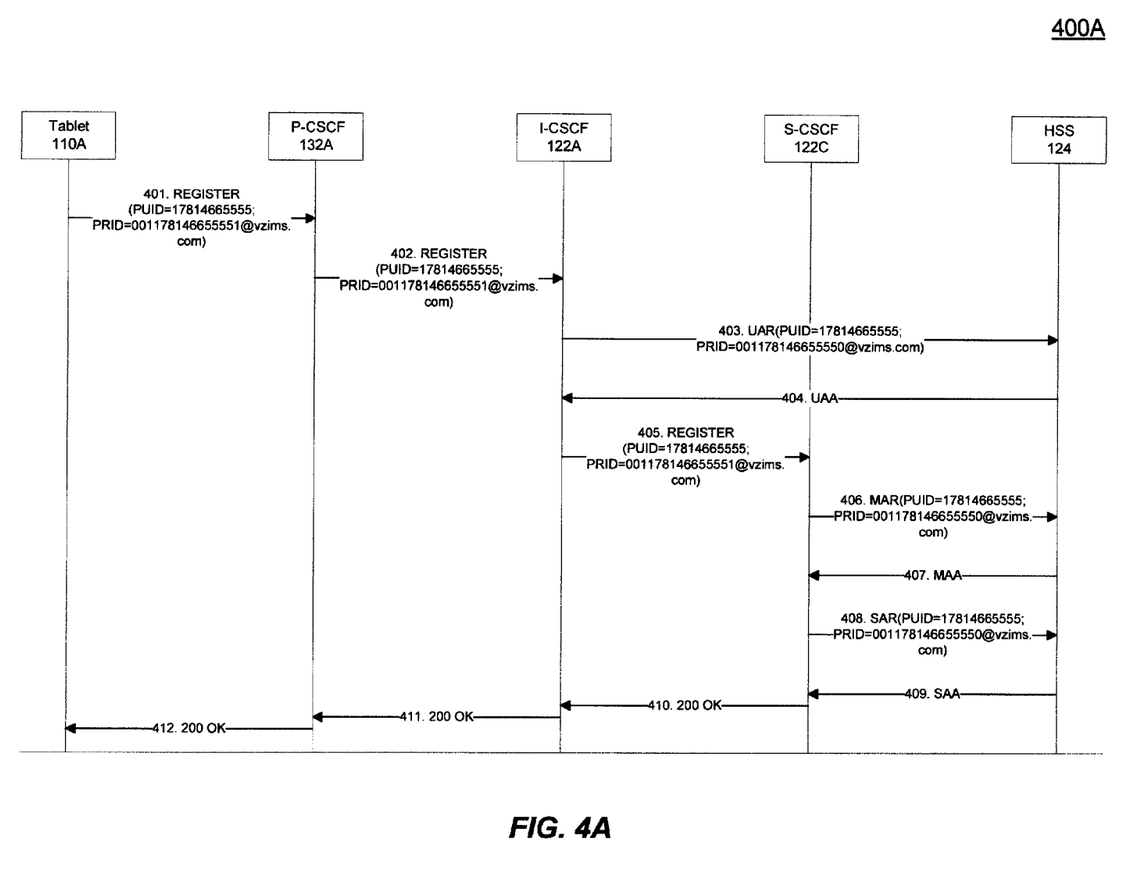
FIGS. 4A and 4B are flowcharts of an exemplary process for registering two related and commonly provisioned subscriber devices in network service architecture.
Figure 4B:
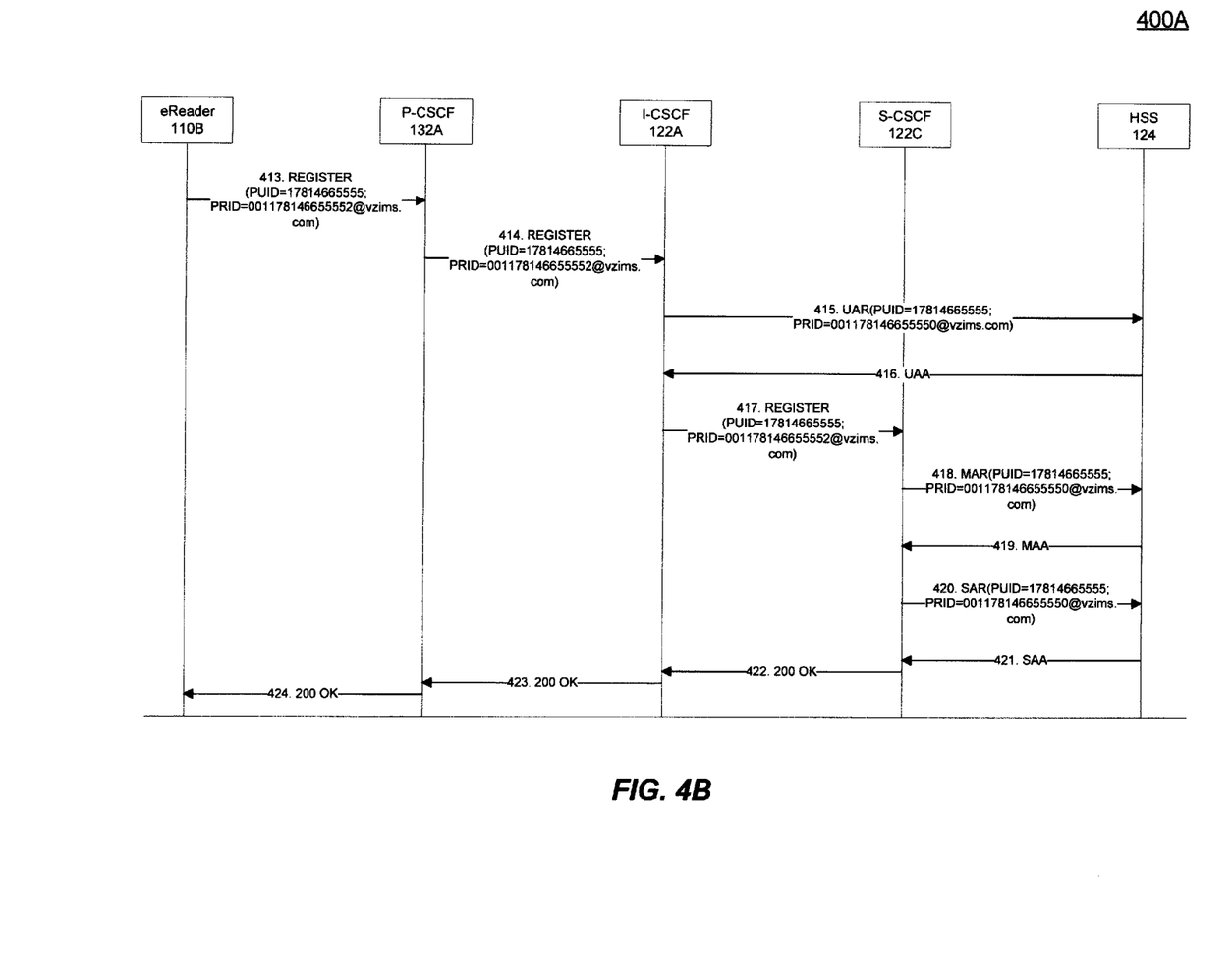

FIGS. 4A and 4B are flowcharts of an exemplary process for registering two related and commonly provisioned subscriber devices in network service architecture 100. By way of example, process 400A and 400B will also be described using the component systems/devices of networking environment 100 of FIG. 1, as described above. FIG. 4A is a flowchart of an exemplary process 400A for a process of registering a table device 110A with HSS 124 of networking environment 100 of FIG. 1. While process 400A is described registering tablet device 110A with HSS 124 via P-CSCF 132A, I-CSCF 122A, and S-CSCF 122C, it should be noted that process 400A is not intended to be limited thereto and that process 400A may be used with devices and systems of different networking environments.

As shown in FIG. 4A, process 400A begins at step 401, in which tablet device 110A sends a register message to the P-CSCF 132A. Similar to the normal registration process, the register message may include the PUID, which is the mobile subscriber integrated services digital network number of the tablet device 110A, and the PRID. The PRID in this case differs from the PRID used in the normal registration process.

The PRID in this case is a special construct PRID. In some aspects, the special construct PRID includes a group prefix, the PUID associated with the subscriber, and a device ID in a particular group. In this example, the tablet device 110A has a PRID of 001178146655551, where the group prefix is "001", the PUID associated with the subscriber is "17814665555", and the device ID in a particular group is "1". In step 402, P-CSCF 132A delivers the register message to the I-CSCF 122A in order for the I-CSCF 122A to check if the tablet device 110A has the right to be registered based on the PUID and PRID. The I-CSCF 122A performs an analysis to determine if the received PRID is a special construct PRID. A special construct PRID may be identified by a predefined lead-in string of digits. For example, the PRID has a lead-in of "00" in this case, which indicates to the I-CSCF 122A that the PRID is a special construct PRID. Once the I-CSCF 122A determines that the PRID is a special construct PRID, the I-CSCF 122A locates a substring in the PRID that is equivalent to the subscriber's PUID. All the digits following the PUID substring in the PRID are then identified as the device ID of the particular group.

In step 403, I-CSCF 122A zeroes out all digits identified as the device ID and sends this wildcarded PRID to the HSS 124. Once the HSS 124 receives the wildcarded PRID, the HSS 124 will check the wildcarded PRID against records to find out whether this wildcarded PRID exists in the records. The HSS 124 will return a UAA to the I-CSCF 122A in step 404 if the HSS 124 is able to resolve that the table device 110A is in the records. In step 405, the I-CSCF 122A delivers the register command to the assigned S-CSCF 122C. The S-CSCF assignment, as discussed earlier, is performed based on the PUID of the smartphone device 110E described in the normal registration process in reference to FIG. 3. Since the tablet device 110A uses the same PUID as the smartphone device 110E in FIG. 3, this registration will result in the use of the same S-CSCF 122C.

Similar to the I-CSCF 122A, the S-CSCF 122C will analyze the PRID. When the S-CSCF 122C determines that the PRID includes a pair of leading zeros, the S-CSCF 122C will determine that this is a special construct PRID, and will locate the trailing device ID in the particular group. The S-CSCF 122C will then replace the device ID number with zeros to create a wildcarded PRID. The wildcarded PRID is then sent in the MAR to the HSS 124 in step 406 to request a particular service. If the particular service is enabled, the HSS 124 returns a MAA in step 407.

In step 408, the S-CSCF 122C updates the HSS by sending a SAR, which provides an indication that the S-CSCF 122C will serve the tablet device 110A. In step 409, the HSS 124 confirms the assignment by returning a SAA to the S-CSCF 122C. In steps 410, the S-CSCF 122C sends code (e.g., "200 OK") to the I-CSCF 122A indicating that the register operation completed successfully. The I-CSCF 122A, in turn, sends the same code to the P-CSCF 132A in step 411, also indicating that the register operation completed successfully. Lastly, the P-CSCF 132A relays the register operation completed code to the tablet device 110A in step 412, thus completing the normal registration process.

FIG. 4B illustrates an exemplary process 400B that is similar to process 400A. Process 400B differs from 400A in that the registration is performed for the eReader device 110B, and thus utilizes a different PRID. Process 400B begins at step 413, in which eReader device 110B sends a register message to the P-CSCF 132A. Similar to the registration process of the tablet device 110A, the register message includes the PUID, which is the mobile subscriber integrated services digital network number of the eReader device 110B, and the PRID. The PRID in this case is similar to the PRID used in registering the tablet device 110A in that the PRID is also a special construct PRID that includes a group prefix, the PUID associated with the subscriber, and a device ID in a particular group. In this example, the eReader device 110B has a PRID of 0011178146655551, where the group prefix is "001", the PUID associated with the subscriber is "17814665555", and the device ID in a particular group is "2". Since the tablet device 110A and the eReader device 110B are in the same group, the group prefix between the two subscriber devices will be the same. The eReader device 110B must have a different device ID number from the tablet device 110A because each device must be uniquely identifiable. Thus, the device ID of the eReader device 110B is "2". But the I/S-CSCF both zero out the device ID number in order to create a similar wildcarded PRID for the tablet device 110A and the eReader device in 110B.

In step 414, P-CSCF 132A delivers the register message to the I-CSCF 122A in order for the I-CSCF 122A to check if the tablet device 110A has the right to be registered based on the PUID and PRID. The I-CSCF 122A performs an analysis to determine if the received PRID is a special construct PRID. Since the PRID has a lead-in of "00" in this case, the I-CSCF 122A will treat the PRID as a special construct PRID. The I-CSCF 122A may locate a substring in the PRID that is equivalent to the subscriber's PUID, and zero out all the digits following the PUID substring in the PRID (i.e., the device ID of the particular group).

In step 415, I-CSCF 122A sends the wildcarded PRID with the zeroed out digits to the HSS 124. Once the HSS 124 receives the wildcarded PRID, the HSS 124 will go and check the records to find out whether this wildcarded PRID exists in the records. The HSS 124 will return a UAA to the I-CSCF 122A in step 416 if the HSS 124 is able to resolve that the table device 110A is in the records. In step 417, the I-CSCF 122A delivers the register command to the assigned S-CSCF 122C. Since the eReader device 110B uses the same PUID as the smartphone device 110E in FIG. 3, this registration will result in the use of the same S-CSCF 122C.

Similar to the I-CSCF 122A, the S-CSCF 122C will analyze the PRID. When the S-CSCF 122C determines that the PRID includes a pair of leading zeros, the S-CSCF 122C will determine that this is a special construct PRID, and will locate the trailing device ID in the particular group. The S-CSCF 122C will then replace the device ID number with zeros to create a wildcarded PRID. The wildcarded PRID is then sent in the MAR to the HSS 124 in step 418 to request a particular service. If the particular service is enabled, the HSS 124 returns a MAA in step 419.

In step 420, the S-CSCF 122C updates the HSS by sending a SAR, which provides an indication that the S-CSCF 122C will serve the eReader device 110B. In step 421, the HSS 124 confirms the assignment by returning a SAA to the S-CSCF 122C. In steps 422, the S-CSCF 122C sends code (e.g., "200 OK") to the I-CSCF 122A indicating that the register operation completed successfully. The I-CSCF 122A, in turn, sends the same code to the P-CSCF 132A in step 423, also indicating that the register operation completed successfully. Lastly, the P-CSCF 132A relays the register operation completed code to the eReader device 110B in step 424, thus completing the normal registration process.

As can be seen in FIGS. 4A and 4B, the generation of the wildcarded PRID can occur on both the I-CSCF 122A and the S-CSCF 122C because both components are communicatively coupled to the HSS 124. In other words, every component that communicates with the HSS 124 may generate and use the wildcarded PRID, as opposed to using a real PRID. In some aspects, the I-CSCF 122A and the S-CSCF 122C may be substantially the same, with the difference being that the I-CSCF 122A communicates with the HSS 124 only once, and then assigning, based on the PUID, all further communication to be performed by the S-CSCF 122C. By generating and using wildcarded PRIDs, the IMS network 120 may reduce the number of HSS profiles required for each subscriber. For example, instead of having a unique profile for each subscriber device, the wildcarded PRIDs enables multiple devices of the same category to share a single profile. Since devices of the same category generally request the same types of services, sharing a single profile among devices of the same category may be practicable and efficient.

As shown by the above discussion, functions relating to generating and providing the wildcarded PRIDs may be implemented on the IMS network 120, as shown in FIG. 1. However, it should be noted that such functions are not limited thereto and that such functions also may be implemented using other types of multimedia subsystem.

A general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, as described herein. The software code is executable by the general-purpose computer. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for providing specially constructed PRIDs, as shown in FIGS. 4A and 4B.

Figure 5:
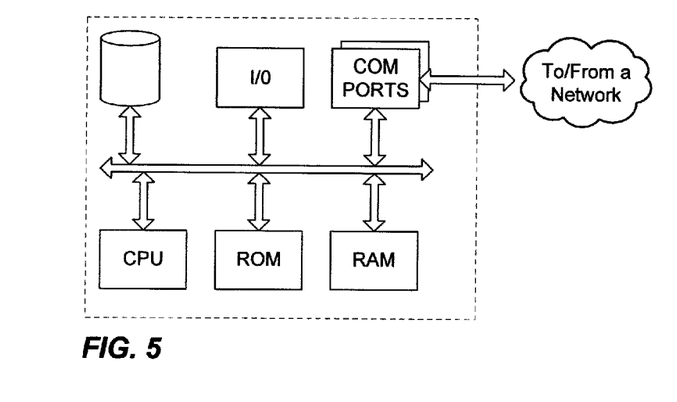
FIG. 5 is a simplified functional block diagram of an example computer that may be configured as a host or server in the network environment of FIG. 1.
Figure 6:
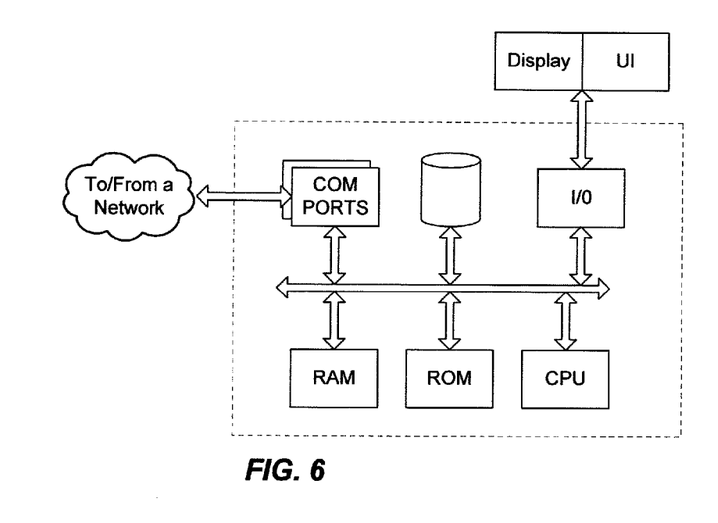
FIG. 6 is a simplified functional block diagram of an example mobile device, personal computer or other workstation or terminal device in the network environment of FIG. 1.

FIGS. 5 and 6 provide functional block diagram illustrations of general purpose computer hardware platforms. FIG. 5 illustrates a network or host computer platform, as may typically be used to implement a server (e.g., HSS 124, S-CSCFs 122B and 122C, or P-CSCF 132A-132D of FIG. 1, as described above). FIG. 6 depicts a computer or workstation device with user interface elements, as may be used to implement a user terminal device (e.g., subscriber devices 110A-110E of FIG. 1, as described above). It is believed that the structure, programming and general operation of such computer equipment should be self-explanatory from the drawings.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature. Of course, the server functions may be implemented in a distributed fashion on a number of similar platforms, to distribute the processing load.

Hence, aspects of the various network components of the mobile communication networks of FIG. 1 (e.g., server 140 and database 150, HSS 124, S-CSCFs 122B and 122C, or P-CSCF 132A-132D of FIG. 1), as described above, may be embodied in programming. Program aspects of the technology may be thought of as "products" or "articles of manufacture" typically in the form of executable code or process instructions and/or associated data that is stored on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of a network communication service provider into the computer platform of the server or network element described above that is provisioning and/or using the IDs under discussion herein.

Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible storage media, terms such as "computer" or "machine readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the functions performed by the various network components of FIG. 1, as described above. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

As noted above, the device as illustrated in the example of FIG. 6 may be a mobile computer with user interface elements, as may be used to implement a laptop, tablet, smartphone or notebook computer or the like. For example, such a device may include a touch-screen display for user input and output. Alternatively, the device may include a standard light emitting diode (LED) display and, for example, an alphanumeric keypad or T9 keyboard. It is believed that the structure, programming, and general operation of such computing equipment and as a result the drawing should be self-explanatory. A user terminal device comprises a central processor or other processing device, an internal communication bus, various types of memory or storage media (RAM, ROM, EEPROM, cache memory, disk drives, etc.) for code and data storage, and one or more network interface cards or ports for communication purposes. Also, the mobile implementation of the device can further comprise various wireless transceiver modules (or components) such as GPS, WiFi, IrDA, Bluetooth, etc. The software functionalities involve programming, including executable code, associated stored data, and graphical user interface code for implementing a client application program at the device. The software code is executable by the processor of the user terminal device. In operation, the code is stored within the user terminal device. At other times, however, the software may be stored at other locations and/or transported for loading into the appropriate user terminal device. Execution of such code by a processor of the user terminal device enables the device to implement device-side aspects of the methodology of provisioning data related to different subscribers and subscriber devices, in essentially the manner performed in the implementation discussed and illustrated herein.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

APPENDIX: ACRONYM LIST

The description above has used a large number of acronyms to refer to various services, messages and system components. Although generally known, use of several of these acronyms is not strictly standardized. For the convenience of the reader, the following list correlates terms to acronyms, as used by way of example in the detailed description above.

3GPP—Third (3rd) Generation Partnership Project
CD—Compact Disk
CD-ROM—Compact Disk-Read Only Memory
CPU—Central Processing Unit
CSCF—Call Session Control Function
DVD—Digital Video Disk
DVD-ROM—Digital Video Disk-Read Only Memory
EEPROM—Electrically Erasable Programmable Read Only Memory
EPROM—Erasable Programmable Read Only Memory
HSS—Home Subscriber Server
I-CSCF—Interrogating Call Session Control Function
IR—Infrared
IMS—Internet Protocol Multimedia Subsystem
IMSI—International Mobile Subscriber Identity
ISDN—Mobile Subscriber Integrated Services Digital Network
MAA—Multimedia Authorization Acknowledgement
MAR—Multimedia Authorization Request
P-CSCF—Proxy Call Session Control Function
PDA—Personal Digital Assistant
PRID—Private User Identity
PROM—Programmable Read Only Memory
PUID—Public User Identity
RAM—Random Access Memory
ROM—Read Only Memory
SAA—Server Assignment Answer
SAR—Server Assignment Request
S-CSCF—Serving Call Session Control Function
SIP—Session Initiation Protocol
UAA—User Authentication Acknowledgement
UAR—User Authentication Request
UE—User Equipment

What is claimed is:

1. A method comprising steps of:
generating, for each of a plurality of user devices associated together under one user account for service through a communication network, a unique Private Identity (PRID) of a predetermined format, each PRID for a respective one of the devices comprising:

(a) a group indicator identifying the PRID as associated with a group of devices subject to a common service profile for communication service through the communication network;

(b) a Public Identity (PUID) string of characters assigned to uniquely identify the one user account in the communication network; and (c) a device identifier uniquely assigned to identify the respective device within the group under the one user account; and generating only one common PRID of the predetermined format for identifying the common service profile with respect to all of the devices of the group under the one user account, the common PRID comprising:

(i) the group indicator;

(ii) the PUID; and (iii) a wildcard in a field of the predetermined format for a device identifier.

2. The method of claim 1, wherein the unique PRID and the only one common PRID are provisioned to a home subscriber server (HSS) of the communication network.

3. The method of claim 1, wherein:
the wildcard comprises a string of zeroes, and
a number of zeroes in the string corresponds to the number of digits of the device identifier.

4. The method of claim 1, wherein the group indicator is embedded in a predetermined number of leading digits, the predetermined number of leading digits providing an indication of a special construct PRID, and remaining digits corresponding to the group indicator.

5. The method of claim 1, wherein:
the common service profile corresponds to one of a plurality of categories of user devices served by the communication network,
each category having a unique service profile, and
each device in the group of devices subject to the common service profile is a device of the one category.

6. The method of claim 1, wherein the one common PRID is utilized to request access to services controlled by the HSS.

7. The method of claim 6, wherein the services controlled by the HSS are determined based on the group indicator of the one common PRID provided to the HSS.

8. The method of claim 1, wherein the PUID corresponds to a phone number associated with the one user account.

9. A method comprising steps of:
receiving, at a server, a Private Identity (PRID) of a first format for a particular user device associated with a user account;

determining whether the first format of the PRID corresponds to a predefined format;

upon determining the first format of the PRID corresponds to the predefined format, generating a common PRID of a second format for identifying a common service profile corresponding to a group of devices under the user account, the particular device belonging to the group of devices, and the common PRID comprising:

(i) a group indicator identifying the PRID as associated with the group of devices subject to the common service profile for communication service through a communication network;

(ii) a Public Identity (PUID) string of characters assigned to uniquely identify the user account in the communication network; and
(iii) a wildcard for a device identifier; and
sending the common PRID to a home subscriber server (HSS) in order to register the particular user device to receive services corresponding to the common service profile.

10. The method of claim 9, wherein the PRID of the first format comprises:
(a) a group indicator identifying the PRID as associated with a group of devices subject to a common service profile for communication service through the communication network;
(b) a Public Identity (PUID) string of characters assigned to uniquely identify the one user account in the communication network; and
(c) a device identifier uniquely assigned to identify the respective device within the group under the one user account.

11. The method of claim 10, wherein determining whether the first format of the PRID corresponds to the predefined format comprises determining if a first set of digits of the PRID corresponds to a predefined set of digits of the predefined format.

12. The method of claim 9, wherein the PRID is received at the server when the particular user device initiates registration with the server.

13. The method of claim 9, wherein the server is one of an Interrogating Call Session Control Function (I-CSCF) or a Serving Call Session Control Function (S-CSCF).

14. The method of claim 9, wherein the common service profile corresponds to a category of user device, each category of user device having a unique service profile, and wherein the common PRID is sent to the HSS in order to request access to services controlled by the HSS.

15. A server, comprising:
a network communication device configured to exchange data communications through a mobile communication network, the mobile communication network including at least one database accessible to the network communication device;
a processor coupled to the network communication device;
a storage device accessible to the processor; and
a program in the storage device, the program including a plurality of functions, wherein execution of the application program by the processor configures the server to perform functions, including functions to:
generate, for each of a plurality of user devices associated together under one user account for service through a communication network, a unique Private Identity (PRID) of a predetermined format, each PRID for a respective one of the devices comprising:
(a) a group indicator identifying the PRID as associated with a group of devices subject to a common service profile for communication service through the communication network;
(b) a Public Identity (PUID) string of characters assigned to uniquely identify the one user account in the communication network; and
(c) a device identifier uniquely assigned to identify the respective device within the group under the one user account; and
generate only one common PRID of the predetermined format for identifying the common service profile with respect to all of the devices of the group under the one user account, the common PRID comprising:
(i) the group indicator;
(ii) the PUID; and
(iii) a wildcard in a field of the predetermined format for a device identifier.

16. The server of claim 15, wherein the unique PRID and the only one common PRID are provisioned to a home subscriber server (HSS) of the communication network.

17. The server of claim 15, wherein:
the common service profile corresponds to one of a plurality of categories of user devices served by the communication network,
each category having a unique service profile, and
each device in the group of devices subject to the common service profile is a device of the one category.

18. The server of claim 15, wherein the one common PRID is provided to the HSS in order to request access to services controlled by the HSS.

19. An article of manufacture, comprising a non-transitory computer-readable medium and computer-executable instructions embodied in the medium that, if executed by a computing device, cause the computing device to perform functions for a provisioning server in a mobile communication network including:
generating for each of a plurality of user devices associated together under one user account for service through a communication network with a unique Private Identity (PRID) of a predetermined format, each PRID for a respective one of the devices comprising:
(a) a group indicator identifying the PRID as associated with a group of devices subject to a common service profile for communication service through the communication network;
(b) a Public Identity (PUID) string of characters assigned to uniquely identify the one user account in the communication network; and
(c) a device identifier uniquely assigned to identify the respective device within the group under the one user account; and
generating only one common PRID of the predetermined format for identifying the common service profile with respect to all of the devices of the group under the one user account, the common PRID comprising:
(i) the group indicator;
(ii) the PUID; and
(iii) a wildcard in a field of the predetermined format for a device identifier.

20. The article of manufacture of claim 19, wherein:
the unique PRID and the only one common PRID are provisioned to at least one of a Call Session Control Function (CSCF) or a home subscriber server (HSS) of the communication network, and
the one common PRID is utilized to determine services controlled by the HSS.

* * * * *